(12) United States Patent
Mann

(10) Patent No.: US 7,468,883 B2
(45) Date of Patent: Dec. 23, 2008

(54) POWER DISTRIBUTION PANEL WITH SELECTABLE OUTPUT VOLTAGES

(75) Inventor: Raymond A. Mann, Wellington, OH (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 43 days.

(21) Appl. No.: 11/800,751

(22) Filed: May 7, 2007

(65) Prior Publication Data

US 2008/0278890 A1 Nov. 13, 2008

(51) Int. Cl.
*H02B 1/26* (2006.01)
*H02B 1/04* (2006.01)
*H02B 1/015* (2006.01)
*H02B 1/20* (2006.01)

(52) U.S. Cl. ........................ 361/641; 361/643; 361/644; 361/647; 361/648; 361/652

(58) Field of Classification Search ........................ None
See application file for complete search history.

(56) References Cited

U.S. PATENT DOCUMENTS

| | | | |
|---|---|---|---|
| 4,159,504 A * | 6/1979 | Cook | 361/650 |
| 4,931,903 A * | 6/1990 | Cole | 361/645 |
| 5,343,356 A * | 8/1994 | Hancock | 361/637 |
| 5,577,923 A | 11/1996 | Lee | |
| 5,894,405 A * | 4/1999 | Fleege et al. | 361/634 |
| 5,973,914 A * | 10/1999 | Rose et al. | 361/627 |
| 6,456,203 B1 | 9/2002 | Schomaker et al. | |
| 6,813,142 B1 * | 11/2004 | Seff | 361/637 |
| 7,256,984 B2 * | 8/2007 | Kim et al. | 361/624 |

* cited by examiner

*Primary Examiner*—Boris L Chervinsky
(74) *Attorney, Agent, or Firm*—Harness, Dickey & Pierce, P.L.C.

(57) ABSTRACT

An electric power distribution panel includes a plurality of slots for supplying power to circuit breakers, a first input bus for coupling to a first power source, a second input bus for coupling to a second power source, and a plurality of circuit breaker carriers. Each carrier is positioned in one of the slots and selectably movable in its slot between a first position for coupling a circuit breaker to the first input bus, and a second position for coupling a circuit breaker to the second input bus.

21 Claims, 4 Drawing Sheets ns movable between more than two positions for coupling to more than two input busses.

POWER DISTRIBUTION PANEL WITH SELECTABLE OUTPUT VOLTAGES

FIELD

This disclosure relates to electric power distribution panels including power distribution panels capable of selectively supplying one of several different voltages to one or more circuit breakers installed in the panel.

BACKGROUND

The statements in this section merely provide background information related to the present disclosure and may not constitute prior art.

Power distribution panels are commonly used to distribute electric power from an input power source to multiple electric loads (also referred to as circuits) via circuit breakers. These distribution panels usually include a plurality of positions (known as "slots") for supporting circuits breakers. Each slot is electrically coupled to a voltage input bus for supplying a specific voltage (such as 120 volts ac, +24 volts dc, −48 volts dc, etc.) to the circuit breaker installed in that slot. Each circuit breaker has an output terminal that is electrically connected to a load. Under normal conditions, the circuit breaker couples its input voltage to the load. Upon detecting an overcurrent condition, the circuit breaker "trips" (or "blows," if the circuit breaker is a fuse) to disconnect its input voltage from the load.

SUMMARY

According to one aspect of this disclosure, an electric power distribution panel includes a first input bus for coupling to a first power source, a second input bus for coupling to a second power source, and at least one circuit breaker carrier. The carrier is selectively movable between a first position for coupling a circuit breaker to the first input bus, and a second position for coupling a circuit breaker to the second input bus.

According to another aspect of this disclosure, an electric power distribution panel includes a plurality of slots for supplying power to circuit breakers, a first input bus for coupling to a first power source, a second input bus for coupling to a second power source, and a plurality of circuit breaker carriers. Each carrier is positioned in one of the slots and selectably movable in its slot between a first position for coupling a circuit breaker to the first input bus, and a second position for coupling a circuit breaker to the second input bus.

According to yet another aspect of this disclosure, a method is provided for using an electric power distribution panel having at least first and second input busses and a circuit breaker carrier selectably movable between a first position for coupling a circuit breaker to the first input bus and a second position for coupling a circuit breaker to the second input bus. The method includes energizing the first input bus with a first voltage source, energizing the second input bus with a second voltage source, and installing a circuit breaker to the carrier with the carrier in the first position to thereby couple the circuit breaker to the first input bus.

Further areas of applicability will become apparent from the description provided herein. It should be understood that the description and examples set forth below are provided for purposes of illustration only and are not intended to limit the scope of this disclosure.

DRAWINGS

The drawings described herein are for illustration purposes only and are not intended to limit the scope of the present disclosure in any way.

DETAILED DESCRIPTION

Figure 1:
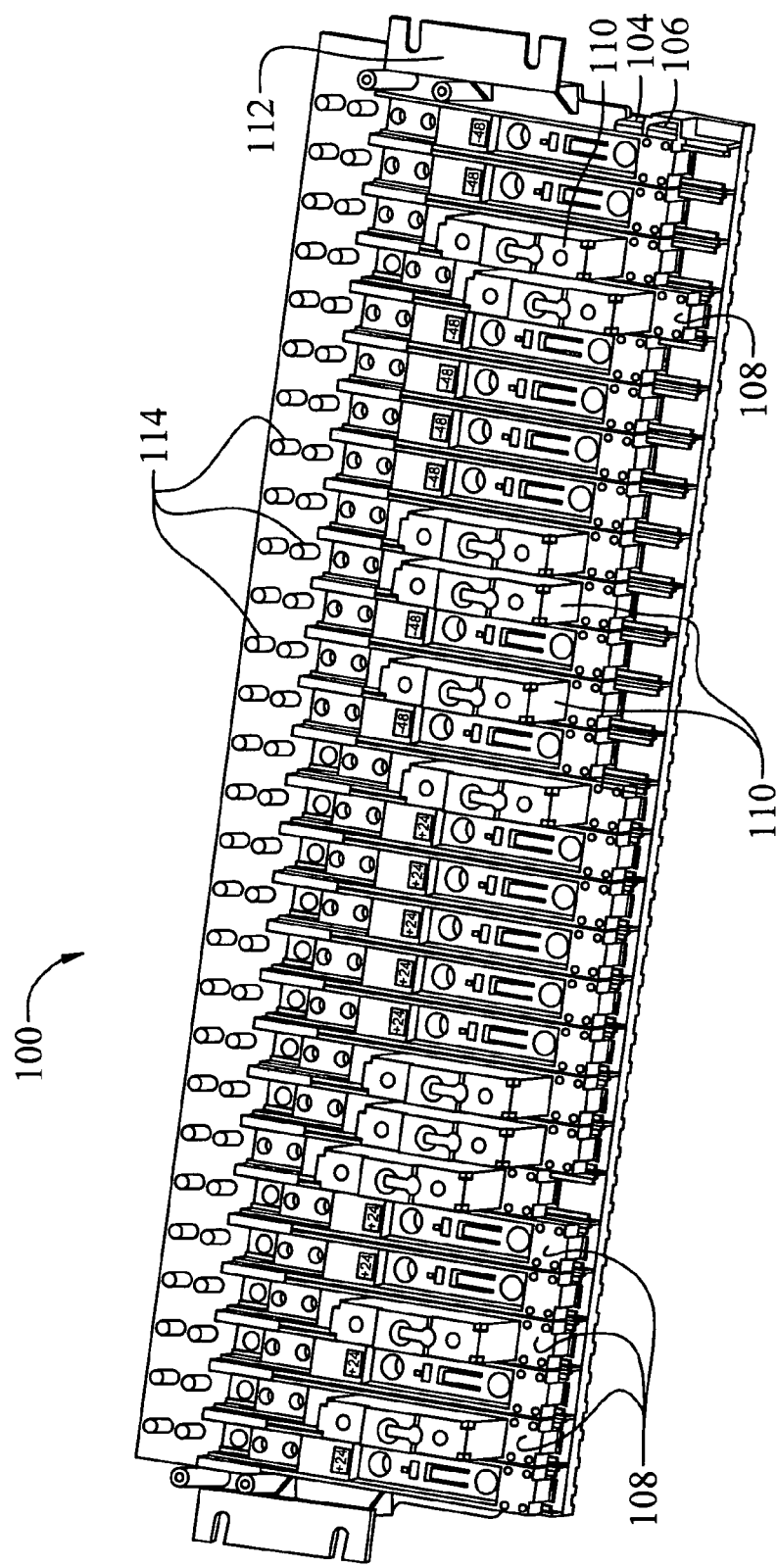
FIG. 1 is an isometric view of an electric power distribution panel according to one embodiment of the present disclosure.

The following description is merely exemplary in nature and is not intended to limit the present disclosure nor its potential applications or uses. It should be understood that throughout the drawings, corresponding reference numerals indicate like or corresponding parts and features According to one aspect of this disclosure, a method is provided for using an electric power distribution panel having at least first and second input busses and a circuit breaker carrier selectably movable between a first position for coupling a circuit breaker to the first input bus and a second position for coupling a circuit breaker to the second input bus. The method includes energizing the first input bus with a first voltage source, energizing the second input bus with a second voltage source, and attaching a circuit breaker to the carrier with the carrier in its first or second position to thereby couple the circuit breaker to the first or second input bus, respectively. In this manner, electric power can be selectively supplied to the circuit breaker from either the first input bus or the second input bus.

One example of an electric power distribution panel that can be used in such method will now be described with reference to FIGS. 1-4. It should be understood, however, that the method described above can be performed with distributions panels having various configurations and features. Accordingly, the method is not limited to the specific distribution panel described below.

An electric power distribution panel according to one embodiment of this disclosure is illustrated in FIG. 1 and identified generally by reference number 100. As shown in FIG. 1, the panel 100 includes a first input bus 104 for coupling to a first power source, and a second input bus 106 for coupling to a second power source. The panel 100 further includes several circuit breaker carriers 108. Each carrier 108 is configured for supporting a circuit breaker 110—either directly or via a circuit breaker holder such as a fuse holder. Further, each carrier 108 is selectably movable between a first position for coupling a circuit breaker to the first input bus 104, and a second position for coupling a circuit breaker to the second input bus 106. In this manner, each slot in the panel 100 can be used to selectively couple either one of the first input bus 104 and the second input bus 106 to a circuit breaker.

Although the panel 100 of FIG. 1 includes twenty-eight slots for receiving twenty-eight carriers 108 movable between first and second positions, it should be understood that the present teachings can be applied to a power distribution panel having more or less slots (including only one slot) for receiving movable carriers. Further, while the panel 100 of FIG. 1 includes only two input busses 104, 106, other embodiments may include more than two input busses and carriers that are selectively movable between more than two positions. For example, a panel could include three input busses and one or more carriers movable between three positions for selectively coupling any one of the three input busses to a circuit breaker.

Also shown in FIG. 1 is a preferably nonconductive support structure 112 for supporting the input busses, carriers and circuit breakers, and a conductive return/ground bus 114.

Figure 2:
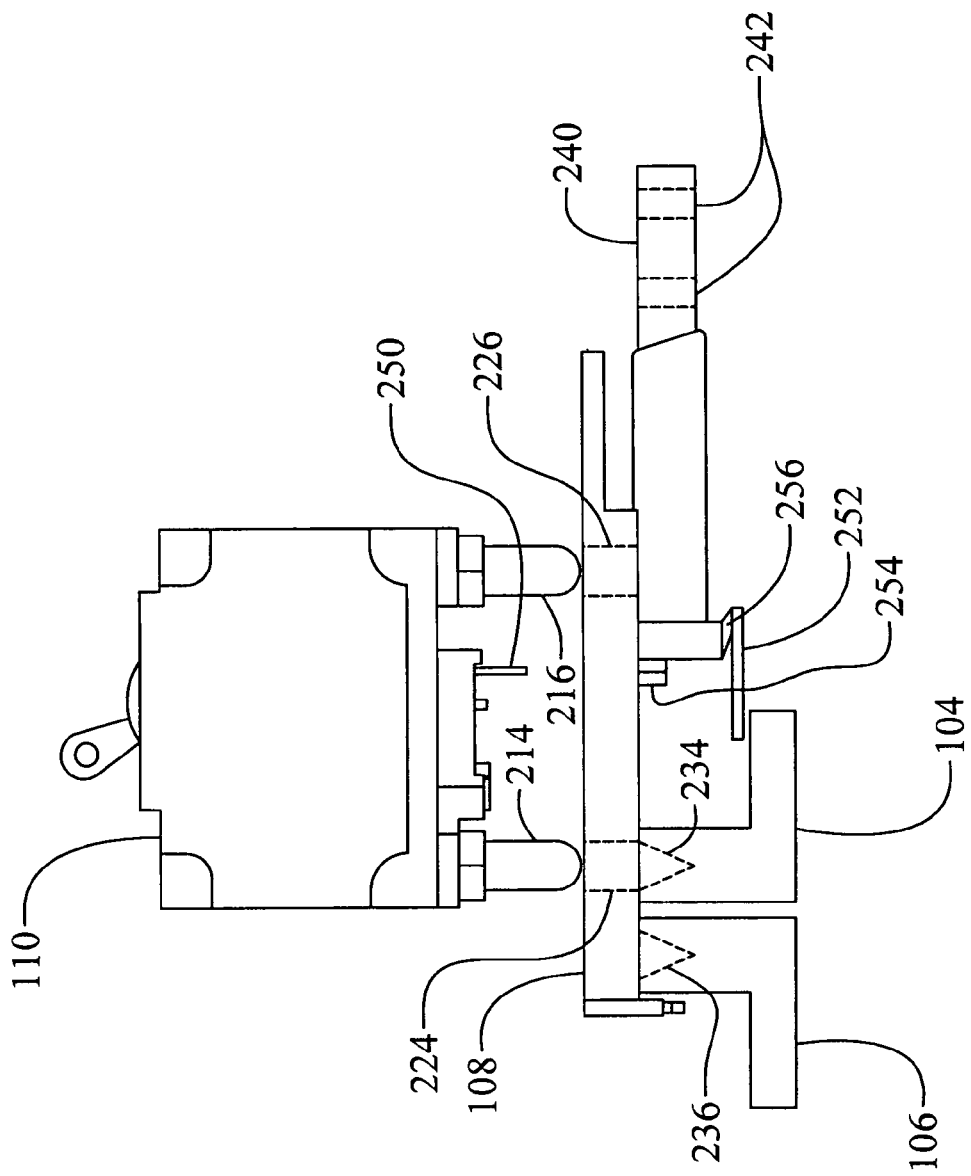
FIG. 2 is a side view showing a circuit breaker carrier in its first position for coupling a circuit breaker to a first input bus.
Figure 3:
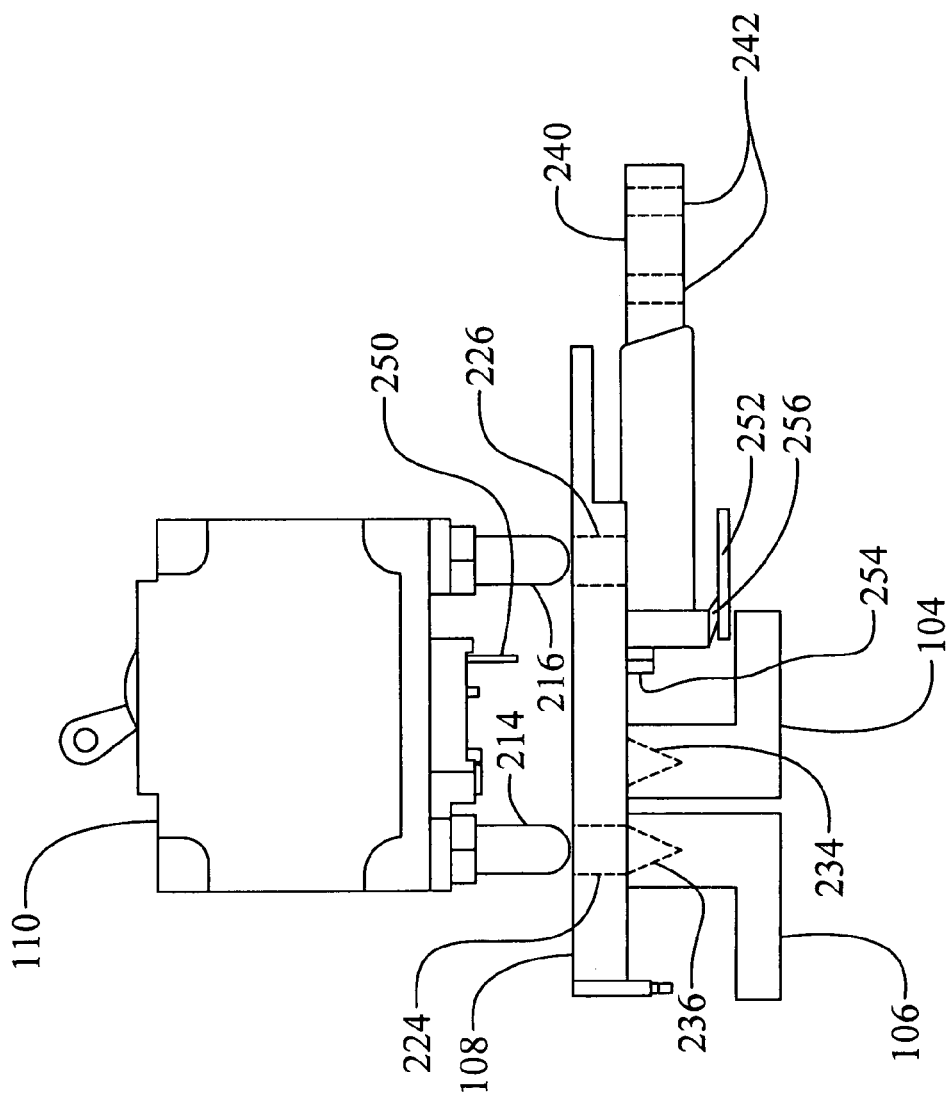
FIG. 3 is a side view showing the circuit breaker carrier of FIG. 2 in its second position for coupling a circuit breaker to a second input bus.

Additional details of the panel 100 are shown in FIGS. 2 and 3. More specifically, FIG. 2 illustrates a single carrier 108 in its first position for coupling a circuit breaker 110 to the first input bus 104, and FIG. 3 illustrates the same carrier 108 in its second position for coupling a circuit breaker 110 to the second input bus 106. As apparent to those skilled in the art, the size and type of the circuit breaker 110 may vary depending on the position of the carrier 108 and the particular input bus to which the circuit breaker 110 will be connected.

Each carrier 108 includes two apertures 224, 226 for receiving two circuit breaker terminals 214, 216. When the circuit breaker 110 is installed on the carrier 108 with the carrier in its first position as shown in FIG. 2, terminal 214 will be electrically coupled to the first input bus 104 via a first electrical contact 234. Alternatively, when the circuit breaker 110 is installed on the carrier 108 with the carrier in its second position as shown in FIG. 3, the terminal 214 will be electrically coupled to the second input bus 106 via a second electrical contact 236. For illustrative purposes, FIGS. 2 and 3 illustrate the circuit breaker 110 positioned above and not yet fully installed on the carrier 108.

Further, when the carrier 108 is in its first position as shown in FIG. 2 with aperture 224 aligned with the first electrical contact 234, a portion of the carrier 108 covers the second electrical contact 236. Conversely, when the carrier 108 is in its second position as shown in FIG. 3 with aperture 224 aligned with the second electrical contact 236, a portion of the carrier 108 covers the first electrical contact 234. In this manner, the carrier inhibits shorting between the first and second input busses 104, 106.

In the particular embodiment shown in the drawings, each carrier 108 also includes an output bus 240 having output terminals 242 for coupling a load to the carrier 108 (e.g., using lugged wires). Regardless of the position of the carrier, when the circuit breaker 110 is installed on the carrier 108, terminal 216 is electrically coupled to the output bus 240 and any load connected to the output bus 240. Although the output terminals 242 are positioned on the carrier 108 in the specific embodiment shown in the figures, the output terminals 242 can be located elsewhere on the panel 100 or on the circuit breaker 110.

In the particular embodiment shown in FIGS. 2 and 3, the carrier 108 is slidably movable between its first position (FIG. 2) and its second position (FIG. 3) when no circuit breaker is installed on the carrier. Conversely, when a circuit breaker 110 is installed on the carrier 110, terminal 214 is mechanically coupled to either the first electrical contact 234 or the second electrical contact 236. This prevents movement of the carrier between its first and second positions until the circuit breaker 110 is removed from the carrier 108.

In various other embodiments, the carrier 108 can be movable between its first and second positions without sliding. For example, the carrier can be configured for pivoting movement between its various positions. Alternatively, the carrier could be removed from and then reinstalled on the distribution panel to change positions.

Referring again to the figures, the carrier 108 is preferably configured to couple an alarm contact 250 provided on the circuit breaker 110 to an alarm circuit 252 in the panel 100. In the embodiment of FIGS. 2 and 3, the carrier 108 includes an alarm contact receptacle 254 and an alarm contact wiper 256. The receptacle 254 and wiper 256 are preferably attached to (or integral with) the carrier so that the receptacle and wiper move with the carrier. The alarm contact receptacle 254 is configured for receiving the alarm contact 250 of the circuit breaker when the circuit breaker is installed on the carrier. The alarm contact receptacle 254 is electrically coupled to the alarm contact wiper 256. The alarm contact wiper 256 maintains electrical contact with panel's alarm circuit 252—which, in the embodiment shown in FIGS. 2 and 3, is a printed circuit board—regardless of the carrier position. Accordingly, when the circuit breaker 110 is installed on the carrier 108, its alarm contact 250 is electrically coupled to the alarm circuit 252 of the power distribution panel.

Figure 4:
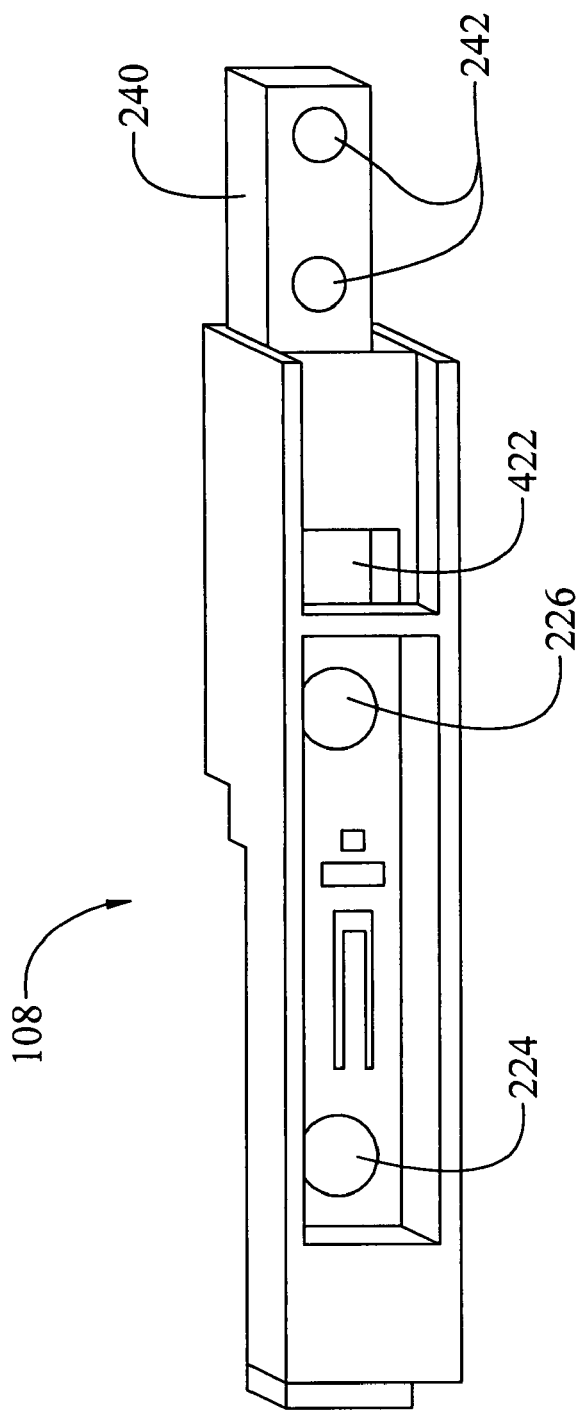
FIG. 4 is a front view of the circuit breaker carrier shown in FIGS. 2 and 3.

FIG. 4 illustrates additional details of the carrier 108 shown in FIGS. 2 and 3. As shown in FIG. 4, the carrier includes a window 422 for providing a visual indication of the carrier's position. Preferably, the window displays the voltage of the first input bus when the carrier is in its first position, and the voltage of the second input bus when the carrier is in its second position. Alternatively, a different type of visual or other (e.g., audible) indication of the carrier's position can be employed.

In one preferred application of the present disclosure, the distribution panel 100 is configured for supplying electric power to equipment in a cellular communications tower. The first input bus is connected to a −48VDC power source, and the second input bus is connected to a +24VDC power source. In this manner, each slot in the distribution panel can be configured for providing either +24VDC or −48VDC to a circuit breaker, depending on the position of the circuit breaker carrier 108. It should be understood, however, that other voltages can be employed. Further the teachings of this disclosure are not limited to cellular communications applications and can be applied to a wide variety of other applications.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. An electric power distribution panel having a plurality of slots for supplying power to circuit breakers, the panel comprising:
   a first input bus for coupling to a first power source;
   a second input bus for coupling to a second power source; and
   a plurality of circuit breaker carriers, each carrier positioned in one of said slots and selectably movable in its slot between a first position for coupling a circuit breaker to the first input bus, and a second position for coupling a circuit breaker to the second input bus.

2. The distribution panel of claim 1 wherein each carrier is slidably movable between its first and second positions.

3. The distribution panel of claim 2 wherein each slot includes a first electrical contact for electrically coupling a circuit breaker terminal to the first input bus, and a second electrical contact for coupling a circuit breaker terminal to the second input bus, the carrier in each slot covering the second electrical contact when the carrier is in its first position and covering the first electrical contact when the carrier is in its second position.

4. An electric power distribution panel comprising:
a first input bus for coupling to a first power source;
a second input bus for coupling to a second power source; and
at least one circuit breaker carrier;
the carrier selectively movable between a first position for coupling a circuit breaker to the first input bus, and a second position for coupling a circuit breaker to the second input bus.

5. The distribution panel of claim 4 wherein the carrier includes an output bus for supplying power from the first input bus or the second input bus to a load.

6. The distribution panel of claim 5 wherein the carrier is configured for electrically coupling a circuit breaker terminal to the output bus when the circuit breaker is installed on the carrier.

7. The distribution panel of claim 4 wherein the carrier is slidably movable between the first and second positions.

8. The distribution panel of claim 4 further comprising an alarm circuit, and wherein the carrier is configured for coupling a circuit breaker alarm contact to the alarm circuit when the circuit breaker is installed on the carrier.

9. The distribution panel of claim 8 wherein the carrier includes an alarm wiper for electrically engaging the alarm circuit when the carrier is in its first and second positions, and wherein the carrier is configured for coupling the circuit breaker alarm contact to the carrier alarm wiper when the circuit breaker is installed on the carrier.

10. The distribution panel of claim 4 further comprising a substantially nonconductive support structure for the first input bus and the second input bus.

11. The distribution panel of claim 4 wherein the panel comprises a plurality of carriers for supporting a plurality of circuit breakers, and wherein each carrier is selectively movable between first and second positions for coupling a circuit breaker to the first or second input bus, respectively.

12. The distribution panel of claim 4 wherein the carrier includes a position indicator.

13. The distribution panel of claim 12 wherein the position indicator is a visual indicator.

14. The distribution panel of claim 4 further comprising a first electrical contact for electrically coupling a circuit breaker terminal to the first input bus, and a second electrical contact for coupling a circuit breaker terminal to the second input bus, the carrier covering the second electrical contact when the carrier is in its first position and covering the first electrical contact when the carrier is in its second position.

15. The distribution panel of claim 4 further comprising a circuit breaker installed on said carrier.

16. The distribution panel of claim 15 wherein the first input bus is coupled to a −48VDC power source, and the second input bus is coupled to a +24VDC power source.

17. A method of using an electric power distribution panel having at least first and second input busses and a circuit breaker carrier selectably movable between a first position for coupling a circuit breaker to the first input bus and a second position for coupling a circuit breaker to the second input bus, the method comprising:
energizing the first input bus with a first voltage source;
energizing the second input bus with a second voltage source; and
installing a circuit breaker on the carrier with the carrier in the first position to thereby couple the circuit breaker to the first input bus.

18. The method of claim 17 further comprising removing the circuit breaker from the carrier, moving the carrier from the first position to the second position, and installing a circuit breaker on the carrier with the carrier in its second position to thereby couple a circuit breaker to the second input bus.

19. The method of claim 18 wherein moving includes slidably moving the carrier from the first position to the second position.

20. The method of claim 19 wherein the carrier covers at least a portion of the second input bus when the carrier is in the first position, and the carrier covers at least a portion of the first input bus when the carrier is in the second position.

21. The method of claim 17 wherein the first voltage source is a −48VDC source and the second voltage source is a +24 VDC source.

* * * * *